Patented Dec. 9, 1947

2,432,153

UNITED STATES PATENT OFFICE 2,432,153

PROCESS FOR RIPENING CELLULOSE ESTERS

Clifford I. Haney, Greenwich, Conn., and Mervin E. Martin, Cumberland, Md., assignors to Celanese Corporation of America, a corporation of Delaware No Drawing. Application August 12, 1944, Serial No. 549,288

10 Claims. (Cl. 260—230)

This invention relates to the production of organic esters of cellulose and relates more particularly to the production of cellulose acetate or other cellulose esters, particularly the lower fatty acid esters of cellulose, of improved characteristics.

An object of this invention is the production of organic acid esters of cellulose of improved stability characteristics.

Another object of this invention is the production of organic acid esters of cellulose of a high degree of polymerization which are particularly adapted for use in molding operations.

A further object of this invention is to provide an improved process for the production of cellulose acetate or other organic acid esters of cellulose by rapid ripening procedures.

Other objects of this invention will appear from the following detailed description.

In the process of preparing organic esters of cellulose, the esterification of cellulose is usually carried out by treating cellulose with an organic acid anhydride in the presence of a catalyst such as sulfuric acid and an organic acid diluent or solvent for the ester of cellulose being formed. The esterified cellulose is obtained in the form of a viscous, homogeneous solution in the organic acid diluent. To this solution water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The cellulose ester is finally washed with water to free it of acids as much as is possible.

Cellulose acetate is prepared in accordance with the above process, by acetylating cellulose with acetic anhydride and a catalyst, such as sulfuric acid, in the presence of glacial acetic acid as a solvent for the cellulose acetate formed. Prior to acetylation the cellulose may, for example, be pretreated with acetic acid or formic acid, or a mixture of these acids, in order to render it more reactive. The acids may be present in a small amount, say, for example, from 1 to 50% on the weight of the cellulose, or in much larger quantities, for example, on the order of 100%, 200%, or even 300% on the weight of the cellulose, and may contain a small quantity of sulfuric acid, for instance, ½ to 1 or 2% on the weight of the cellulose. The pretreatment is preferably allowed to go on for some hours, for example, overnight, though much shorter periods produce the desired results when sulfuric acid is present. The preheated cellulose is then reacted with acetic anhydride and sulfuric acid in appropriate amounts to bring about acetylation. The sulfuric acid catalyst is normally employed in amounts of from 9 to 15%, or even 20% on the weight of the cellulose. Part of the sulfuric acid may be introduced during the pretreatment.

When the acetylation is completed, water is stirred into the reaction mixture to convert the excess acetic anhydride to acetic acid, and, after the addition of a further amount of water, the resulting solution of cellulose acetate in acetic acid is permitted to stand until the desired solubility characteristics are reached. During this standing or ripening period, not only are acetyl groups split off but, in addition, combined sulfuric acid is split off. When the desired solubility characteristics are reached, further ripening is halted and the mixture is treated with a large excess of water or other non-solvent to precipitate the cellulose acetate, the precipitated cellulose acetate is washed with water to remove as much acid and other non-cellulose ester materials as possible and is then subjected to a stabilizing treatment, usually by heating it in suspension in very dilute sulfuric acid, with the object of still further reducing its content of combined sulfuric acid. The latter imparts a tendency to the cellulose acetate to decompose, degrade and/or discolor. The degree of stability is measured by the degree of acidity developed when a sample of cellulose acetate is treated with distilled water under conditions of elevated temperature and pressure for a predetermined period of time. The development of excessive acidity denotes a product of unsatisfactory stability.

When preparing cellulose acetate by the method set forth, the acetylation reaction may take from 1½ to 7 hours and the ripening of the cellulose acetate to the desired solubility characteristics may take from 20 to 50 hours. The stabilization may involve a treatment of the ripened and precipitated cellulose acetate for an additional 3 to 6 hours. Not only is the entire process time-consuming but the ripening and stabilization usually effect a reduction in the degree of polymerization of the esterified cellulose molecule so that it is of somewhat lower viscosity than it was originally. These changes in molecular structure also adversely affect the molding properties of the cellulose acetate.

We have now discovered that cellulose acetate, as well as other organic esters of cellulose of excellent stability characteristics and molding properties, may be prepared without any substantial effect on the degree of polymerization of the esterified cellulose molecule by an improved ripening procedure. In accordance with our invention, this desirable result may be achieved if, after the acetylation reaction, as described, the acid catalyst employed for the acetylation reaction is at least partially neutralized by the addition of suitable neutralizing agents and the primary cellulose acetate in the solution obtained is ripened at an elevated temperature to the desired solubility characteristics, the heating of the cellulose acetate solution being effected by the direct injection of hot vapors of suitable liquids into the ripening solution. As examples of vapors which may be employed in accordance with our invention there may be mentioned steam, hot vaporized acetic acid or mixtures thereof. When preparing other organic esters of cellulose we may also employ steam, vaporized propionic or butyric acid, or mixtures of said acids and steam. Vapors of other organic solvents are suitable as the heating medium but optimum results are obtained when steam is employed.

The steam or other vapors may be passed into the charge by means of a suitable pipe or series of pipes provided with one or more openings beneath the surface of the solution. During heating, the solution is constantly agitated and the heat evolved on condensation of the vapors is dissipated uniformly throughout the charge, thus avoiding any local overheating as may result where heating is effected in a jacketed vessel in which optimum conditions of agitation are not achieved. The solution may be heated by the direct injection of the steam or other hot vapors much more rapidly than when steam jackets are employed and the ripening time may, therefore, be substantially shortened.

While our method of heating primary cellulose acetate solutions during ripening yields improved results in the production of cellulose acetates which are ripened in but a single stage after a portion of the acid catalyst has been neutralized, in the manner well known in the art of manufacturing cellulose acetate or other organic acid esters of cellulose, optimum results are achieved by ripening the cellulose acetate in a plurality of stages.

Any method of ripening in a plurality of stages yields improved cellulose acetates when heating during at least one of said stages is effected by the direct injection of steam, acetic acid, or other vapors into the ripening solution. Thus, in accordance with one method of ripening in a plurality of stages, the neutralizing agent added during the first ripening stage may be added, in an amount sufficient to neutralize from 20 to 70% of the catalyst and water for ripening is then added in an amount of from 5 to 45% on the weight of the original cellulose esterified. The ripening for the first stage is conducted prior to heating at a temperature of 25 to 50° C. for about 30 to 60 minutes. A second water addition is made for the second stage of ripening and an additional amount of neutralizing agent is added further to reduce the amount of acid catalyst present. Usually from 40 to 80% of the catalyst originally present is neutralized for the second stage and from 40 to 75% of water on the weight of the original cellulose is added. Ripening during the second stage may be conducted for 60 to 180 minutes at a temperature of 40 to 70° C. with the injection of steam. The third ripening stage is effected at a temperature of 60 to 70° C., the temperature being increased or maintained, as the case may be, by the direct injection of steam while the ripening solution is subjected to constant agitation. From 100 to 400% of water on the weight of the original cellulose is added during the third stage of ripening, the addition being made at a rate of 30 to 100% per hour until the desired amount of water is added, and the ripening in the third stage is carried out for 2 to 20 hours, or until the desired solubility characteristics are reached. The ripened cellulose acetate may then be precipitated, washed and dried.

The water for ripening may be added as such or, advantageously, may be added in the form of a dilute solution of acetic acid to avoid any substantial precipitation of the cellulose acetate. The neutralizing agent may be added together with the water for ripening, particularly if the latter is added in the form of a dilute solution of acetic acid, or in solution in glacial acetic acid, or it may be added separately in powder form.

The neutralizing agent employed may be a salt of magnesium or calcium, such as, for example, magnesium acetate, calcium acetate, magnesium carbonate or calcium carbonate. Zinc acetate, zinc oxide or the oxides, carbonates, or hydroxides of aluminum, barium, copper, lithium and strontium, as well as organic acid salts of these metals may also be employed as the neutralizing agent. Mixture of any two or more of the foregoing compounds may be used. The neutralizing agent preferably employed in accordance with this invention comprises a mixture of magnesium acetate and calcium acetate.

The cellulosic materials esterified in accordance with our process may be any suitable form of cellulose or cellulose derivative. It may be cotton, cotton linters, wood pulp, regenerated cellulose, or other cellulosic material obtainable from various other sources such as grasses, straws, hulls and the like.

In order further to illustrate our invention but without being limited thereto the following example is given:

*Example*

100 parts by weight of cotton linters are pretreated with a mixture of 35 parts by weight of acetic acid, 0.5 part by weight of sulfuric acid and 0.5 part by weight of water for three hours at 22° C. After pretreatment, the cotton is entered into an acetylizer containing 240 parts by weight of acetic anhydride, 330 parts by weight of acetic acid and 13.25 parts by weight of sulfuric acid. The charge in the acetylizer is cooled to below 0° C. at the start and a peak temperature of 34° C. is reached during acetylation. The acetylation is completed in a little over 1½ hours. After the acetylation is completed, water is added in an amount only sufficient to react with any excess acetic anhydride.

There is then added to the acetylation mixture sufficient neutralizing agent to neutralize 25% of the sulfuric acid present and water is added with the neutralizing agent in an amount equal to 15% by weight on the cellulose. The charge is ripened for about 30 minutes at a temperature of about 30° C. At this point, an additional 42% by weight of water is added and the sulfuric acid present is further neutralized so that the total amount neutralized is now 67%. The charge is ripened for 30 to 180 minutes with the temperature rising from 30° to 60° C. during the second stage, the temperature of the ripening solution being raised to 60° C. by the direct injection of steam during this second stage of ripening. The heating is effected in about 40 minutes and then 33% by weight of water per hour is added to the ripening charge, the third ripening stage being conducted over an additional period of about 3¼ hours. At this point, the cellulose acetate has an acetyl value of 54.4% calculated as acetic acid. The cellulose acetate in solution is precipitated from solution by the addition of a large amount of water. The cellulose acetate obtained possesses excellent stability characteristics, high clarity and viscosity and is of a higher degree of polymerization than cellulose acetate prepared in the same way except for the method of heating.

The heating of the cellulose acetate solution by the direct injection of steam increases the water present for ripening due to the condensation of the steam. The amount, however, is quite small and is practically negligible, corresponding to about 20 to 30% on the weight of original cellulose undergoing acetylation.

While our invention is particularly described in connection with the acetylation of cellulose employing sulfuric acid as catalyst, other catalysts may be used as well, such as phosphoric acid, or mixtures of phosphoric acid and sulfuric acid. Preferably, we employ sulfuric acid alone without any other mineral acid present during the acetylation. In a similar way, employing the proper esterifying agent or agents, other cellulose esters may be prepared, for example, the cellulose esters of propionic, butyric or similar acid or mixed esters, for example, cellulose acetate-propionate or cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the production of organic acid esters of cellulose of improved characteristics wherein cellulose is esterified by means of a lower fatty acid anhydride in the presence of an inorganic acid catalyst, the step which comprises ripening the cellulose ester produced by injecting directly into the ripening solution hot vapors, selected from the group consisting of vapors of steam and lower aliphatic acids, so as to cause the ripening solution to be agitated and the temperature thereof to be raised to at most 70° C.

2. In a process for the production of organic acid esters of cellulose of improved characteristics wherein cellulose is esterified by means of a lower fatty acid anhydride in the presence of an inorganic acid catalyst, at least part of the catalyst present neutralized, water for ripening added and the cellulose ester produced ripened in a plurality of stages, the step which comprises ripening the cellulose ester during at least one of said stages by injecting directly into the ripening solution hot vapors, selected from the group consisting of vapors of steam and lower aliphatic acids, so as to cause the ripening solution to be agitated and the temperature thereof to be raised to at most 70° C.

3. In a process for the production of cellulose acetate of improved characteristics, wherein cellulose is acetylated by means of acetic anhydride in the presence of acetic acid as solvent and sulfuric acid as catalyst, the step which comprises ripening the cellulose acetate produced by injecting directly into the ripening solution hot vapors, selected from the group consisting of vapors of steam and lower aliphatic acids, so as to cause the ripening solution to be agitated and the temperature thereof to be raised to at most 70° C.

4. In a process for the production of cellulose acetate of improved characteristics, wherein cellulose is acetylated by means of acetic anhydride in the presence of acetic acid as solvent and sulfuric acid as catalyst, the step which comprises ripening the cellulose acetate produced by injecting directly into the ripening solution hot vapors of acetic acid, so as to cause the ripening solution to be agitated and the temperature thereof to be raised to at most 70° C.

5. In a process for the production of cellulose acetate of improved characteristics, wherein cellulose is acetylated by means of acetic anhydride in the presence of acetic acid as solvent and sulfuric acid as catalyst, the step which comprises ripening the cellulose acetate produced by injecting directly into the ripening solution hot vapors of aqueous acetic acid, so as to cause the ripening solution to be agitated and the temperature thereof to be raised to at most 70° C.

6. In a process for the production of cellulose acetate of improved characteristics wherein cellulose is acetylated by means of acetic anhydride in the presence of acetic acid as solvent and sulfuric acid as catalyst, at least part of the catalyst present neutralized, water for ripening added and the cellulose acetate ripened in a plurality of stages, the step which comprises ripening the cellulose acetate during at least one of said stages by injecting directly into the ripening solution hot vapors, selected from the group consisting of vapors of steam and lower aliphatic acids, so as to cause the ripening solution to be agitated and the temperature thereof to be raised to at most 70° C.

7. In a process for the production of cellulose acetate of improved characteristics wherein cellulose is acetylated by means of acetic anhydride in the presence of acetic acid as solvent and sulfuric acid as catalyst, at least part of the catalyst present neutralized, water for ripening added and the cellulose acetate ripened in a plurality of stages, the step which comprises ripening the cellulose acetate during at least one of said stages at an elevated temperature produced by the direct injection of steam into the ripening solution.

8. In a process for the production of cellulose acetate of improved characteristics wherein cellulose is acetylated by means of acetic anhydride in the presence of acetic acid as solvent and sulfuric acid as catalyst, at least part of the catalyst present neutralized, water for ripening added and the cellulose acetate ripened in a plurality of stages, the step which comprises ripening the cellulose acetate during at least one of said stages by injecting directly into the ripening solution hot vapors of acetic acid, so as to cause the ripening solution to be agitated and the temperature thereof to be raised to at most 70° C.

9. In a process for the production of cellulose acetate of improved characteristics wherein cellulose is acetylated by means of acetic anhydride in the presence of acetic acid as solvent and sulfuric acid as catalyst, at least part of the catalyst present neutralized, water for ripening added and the cellulose acetate ripened in a plurality of stages, the step which comprises ripening the cellulose acetate during at least one of said stages by injecting directly into the ripening solution hot vapors of aqueous acetic acid, so as to cause the ripening solution to be agitated and the temperature thereof to be raised to at most 70° C.

10. Process for the production of cellulose acetate of improved characteristics, which comprises acetylating cellulose by means of acetic anhydride in the presence of acetic acid as solvent and sulfuric acid as catalyst, neutralizing from 20 to 70% of the catalyst, adding from 5 to 45% of water on the weight of the cellulose and ripening for 30 to 60 minutes at 25 to 50° C., neutralizing a further amount of the catalyst to make a total neutralization of 40 to 80% and adding 40 to 75% of water, ripening for 60 to 180 minutes while agitating and raising the temperature of the ripening solution to a temperature of from 40 to 70° C. and ripening for about 2 to 20 hours while adding 30 to 100% per hour of water to the ripening solution until the desired quantity of water is added, the elevated temperature and agitation being produced by the direct injection of steam into the ripening solution.

CLIFFORD I. HANEY.
MERVIN E. MARTIN.

REFERENCES CITED

The following references are of record in the file of this patent:

UNITED STATES PATENTS

| Number | Name | Date |
|---|---|---|
| 2,064,226 | Seymour | Dec. 15, 1936 |
| 2,028,762 | Dreyfus et al. | Jan. 28, 1936 |
| 2,373,786 | Seymour et al. | Apr. 17, 1945 |

Certificate of Correction

Patent No. 2,432,153.  December 9, 1947.

CLIFFORD I. HANEY ET AL.

It is hereby certified that error appears in the printed specification of the above numbered patent requiring correction as follows: Column 2, line 4, for the word "preheated" read *pretreated*; and that the said Letters Patent should be read with this correction therein that the same may conform to the record of the case in the Patent Office.

Signed and sealed this 23rd day of March, A. D. 1948.

[SEAL]

THOMAS F. MURPHY,
*Assistant Commissioner of Patents.*